United States Patent
Zhou et al.

(10) Patent No.: US 12,200,744 B2
(45) Date of Patent: Jan. 14, 2025

(54) METHODS AND DEVICES FOR WIRELESS COMMUNICATION

(71) Applicant: Telefonaktiebolaget LM Ericsson (publ), Stockholm (SE)

(72) Inventors: Yaxin Zhou, Beijing (CN); Huaisong Zhu, Beijing (CN); Yanyan Zhu, Beijing (CN); Yipeng Zhang, Beijing (CN); Yi Wang, Beijing (CN); Zhi Ge, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 17/639,390

(22) PCT Filed: Sep. 4, 2019

(86) PCT No.: PCT/CN2019/104280
§ 371 (c)(1),
(2) Date: Mar. 1, 2022

(87) PCT Pub. No.: WO2021/042280
PCT Pub. Date: Mar. 11, 2021

(65) Prior Publication Data
US 2022/0330274 A1     Oct. 13, 2022

(51) Int. Cl.
*H04W 72/54*     (2023.01)
*H04J 11/00*     (2006.01)
(Continued)

(52) U.S. Cl.
CPC ......... *H04W 72/54* (2023.01); *H04J 11/0056* (2013.01); *H04L 5/0094* (2013.01);
(Continued)

(58) Field of Classification Search
CPC .... H04L 1/0003; H04L 5/0094; H04J 1/0056; H04W 24/02; H04W 72/20; H04W 72/54
See application file for complete search history.

(56) References Cited

U.S. PATENT DOCUMENTS

| | | |
|---|---|---|
| 10,382,998 B2 | 8/2019 | Mishra et al. |
| 2008/0070586 A1* | 3/2008 | Kermoal .............. H04W 16/04 455/452.2 |

(Continued)

FOREIGN PATENT DOCUMENTS

| | | |
|---|---|---|
| EP | 2229020 A1 | 9/2010 |
| WO | 2018128426 A1 | 7/2018 |
| WO | 2019112493 A1 | 6/2019 |

OTHER PUBLICATIONS

3GPP, "3rd Generation Partnership Project; Technical Specification Group Services and System Aspects; System Architecture for the 5G System; Stage 2 (Release 16)", 3GPP TS 23.501 V16.1.0, Jun. 2019, 1-368.

(Continued)

*Primary Examiner* — Brian P Cox
(74) *Attorney, Agent, or Firm* — Murphy, Bilak & Homiller, PLLC

(57) ABSTRACT

The present disclosure provides a method (100) at a first network node and a method (300) at a second network node. The method (100) at the first network node comprises performing (110) scheduling in a first frequency band and providing (120) information related to a result of the scheduling to the second network node. The method (300) at the second network node comprises obtaining (310) information related to a result of scheduling by the first network node in a first frequency band and determining (320), based at least on the information, a size of a guard band between the first (Continued)

frequency band and a second frequency band to be scheduled by the second network node.

16 Claims, 9 Drawing Sheets

(51) Int. Cl.
    *H04L 5/00*          (2006.01)
    *H04W 24/02*       (2009.01)
    *H04W 72/20*       (2023.01)
    *H04L 1/00*          (2006.01)

(52) U.S. Cl.
    CPC ........... *H04W 24/02* (2013.01); *H04W 72/20* (2023.01); *H04L 1/0003* (2013.01)

(56) References Cited

U.S. PATENT DOCUMENTS

| | | | |
|---|---|---|---|
| 2014/0308968 A1* | 10/2014 | Xiao | H04W 72/27 455/452.1 |
| 2017/0181131 A1 | 6/2017 | Ahmadi | |
| 2018/0191482 A1* | 7/2018 | Zirwas | H04L 5/1469 |
| 2019/0274162 A1* | 9/2019 | Zhang | H04W 74/0808 |

OTHER PUBLICATIONS

LG Electronics, "Handling URLLC in new Rat", 3GPP TSG RAN WG1 Meeting #86, R1-166886, Gothenburg, Sweden, Aug. 22-26, 2016, 1-5.

Sprint Corporation, "The UE behavior correction for LTE/NR spectrum sharing", 3GPP TSG-RAN2 Meeting #106, R2-1907288, Reno, USA, May 13, 2019-May 17, 2019, 1-7.

* cited by examiner

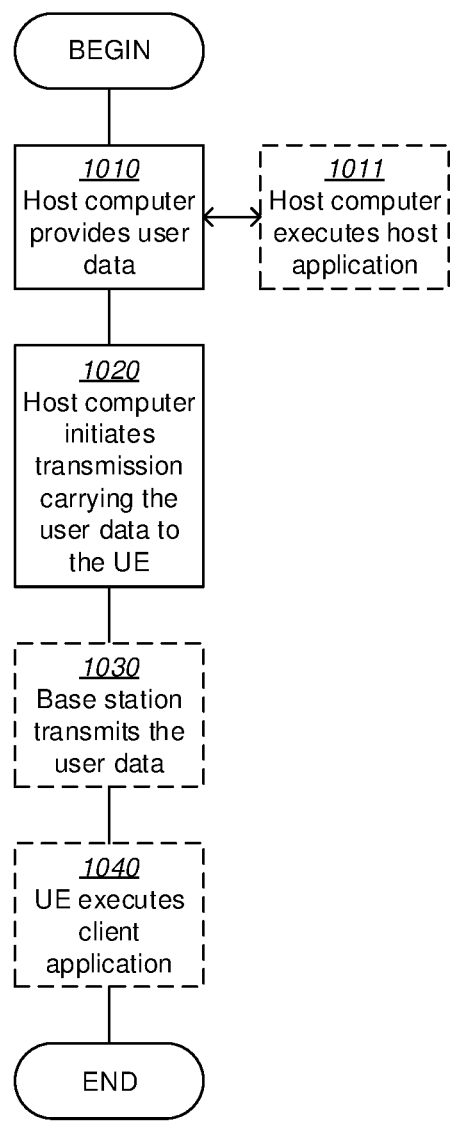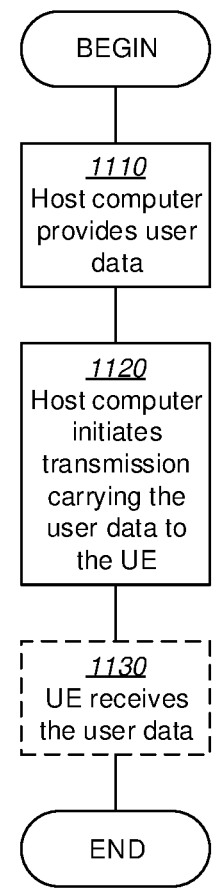
FIG. 10
FIG. 11

METHODS AND DEVICES FOR WIRELESS COMMUNICATION

TECHNICAL FIELD

The present disclosure relates to wireless communication, and more particularly, to guard band allocation in spectrum sharing.

BACKGROUND

Dynamic spectrum sharing between different radio access technologies (RATs), e.g., between Long-Term Evolution (LTE) and New Radio (NR), is attractive because it can make full use of the spectrum resource, especially when one of the RATs is in low load status. Different RATs sharing a spectrum may operate in adjacent frequency bands in the spectrum.

However, there will be interference between the adjacent frequency bands if the corresponding RATs use different subcarrier spacings. For example, if the NR band uses a 30 KHz subcarrier spacing while the adjacent LTE band uses a 15 KHz subcarrier spacing, there may be significant interference between them. A similar problem exists in the case where different bandwidth parts (BWPs) of a RAT share the spectrum but use different subcarrier spacings. For example, if, in a NR cell, a first BWP is configured for enhanced Mobile Broadband (eMBB) with a 15 KHz subcarrier spacing while a second BWP is configured for Ultra-Reliable Low-Latency Communication (URLLC) with a 60 KHz subcarrier spacing, there may be significant interference between the two BWPs.

To reduce this interference, it is usually necessary to set a guard band between the frequency bands used by different RATs or different BWPs.

SUMMARY

Methods, devices, computer-readable storage media and computer program products are provided to allocate a guard band in spectrum sharing.

In a first aspect of the present disclosure, a method at a first network node is provided. The method comprises performing scheduling in a first frequency band and providing information related to a result of the scheduling to a second network node. A size of a guard band between the first frequency band and a second frequency band to be scheduled by the second network node is based at least on the information.

According to an embodiment, the information comprises at least one of an interference plus noise power, a modulation and coding scheme (MCS) and a physical resource block (PRB) number for at least one terminal device operating in the first frequency band.

According to an embodiment, a metric indicating a tolerable inter-band interference for the at least one terminal device is based on the information, and the size of the guard band is determined based at least on the metric.

According to an embodiment, the information comprises a metric indicating a tolerable inter-band interference for at least one terminal device operating in the first frequency band.

According to an embodiment, the metric is determined based on at least one of an interference plus noise power, an MCS and a PRB number for the at least one terminal device.

According to an embodiment, the tolerable inter-band interference is larger for a higher interference plus noise power, a lower MCS level and/or a larger PRB number for the at least one terminal device.

According to an embodiment, the at least one terminal device comprises one or more terminal devices allocated with PRBs adjacent to the guard band.

According to an embodiment, the size of the guard band is determined such that an interference on the at least one terminal device from the second frequency band is below the tolerable inter-band interference.

According to an embodiment, the information comprises a result of PRB allocation in the first frequency band by the first network node.

According to an embodiment, the scheduling in the first frequency band is performed by the first network node without considering interference from the second frequency band.

According to an embodiment, performing the scheduling in the first frequency band comprises: allocating PRBs adjacent to the second frequency band to one or more terminal devices with a low MCS level and/or a large PRB number.

According to an embodiment, the first and second frequency bands have different subcarrier spacings.

According to an embodiment, the first frequency band carries more traffic and/or has a smaller subcarrier spacing than the second frequency band.

According to an embodiment, the first and second frequency bands correspond to a first radio access technology (RAT) and a second RAT, respectively, or correspond to a first bandwidth part and a second bandwidth part, respectively, of the same RAT.

According to an embodiment, the method is performed per scheduling period in the first frequency band.

According to an embodiment, the first network node and/or the second network node is a scheduler.

In a second aspect of the present disclosure, a method at a second network node is provided. The method comprises: obtaining information related to a result of scheduling by a first network node in a first frequency band; and determining, based at least on the information, a size of a guard band between the first frequency band and a second frequency band to be scheduled by the second network node.

According to an embodiment, the information comprises at least one of an interference plus noise power, a modulation and coding scheme (MCS) and a physical resource block (PRB) number for at least one terminal device operating in the first frequency band.

According to an embodiment, determining, based at least on the information, the size of the guard band comprises: determining a metric indicating a tolerable inter-band interference for the at least one terminal device based on the information; and determining the size of the guard band based at least on the metric.

According to an embodiment, the information comprises a metric indicating a tolerable inter-band interference for at least one terminal device operating in the first frequency band.

According to an embodiment, the metric is determined based on at least one of an interference plus noise power, an MCS and a PRB number for the at least one terminal device.

According to an embodiment, the tolerable inter-band interference is larger for a higher interference plus noise power, a lower MCS level and/or a larger PRB number for the at least one terminal device.

According to an embodiment, the at least one terminal device comprises one or more terminal devices allocated with PRBs adjacent to the guard band.

According to an embodiment, the size of the guard band is determined such that an interference on the at least one terminal device from the second frequency band is below the tolerable inter-band interference.

According to an embodiment, the information comprises a result of PRB allocation in the first frequency band by the first network node.

According to an embodiment, the scheduling in the first frequency band is performed without considering interference from the second frequency band.

According to an embodiment, the method further comprises performing scheduling in the second frequency band by taking interference on the second frequency band from the first frequency band into consideration. The interference is determined based at least on the size of the guard band.

According to an embodiment, performing the scheduling in the second frequency band comprises: allocating PRBs adjacent to the guard band to one or more terminal devices with a low MCS level and/or a large PRB number.

According to an embodiment, the first and second frequency bands have different subcarrier spacings.

According to an embodiment, the first frequency band carries more traffic and/or has a smaller subcarrier spacing than the second frequency band.

According to an embodiment, the first and second frequency bands correspond to a first radio access technology (RAT) and a second RAT, respectively, or correspond to a first bandwidth part and a second bandwidth part, respectively, of the same RAT.

According to an embodiment, the method is performed per scheduling period in the second frequency band.

According to an embodiment, the first network node and/or the second network node is a scheduler.

In a third aspect of the present disclosure, a network device is provided. The network device may include a processor and a memory configured to store instructions. The instructions, when executed by the processor, cause the network device to perform the method according to the above first aspect.

In a fourth aspect of the present disclosure, a network device is provided. The network device may include a processor and a memory configured to store instructions. The instructions, when executed by the processor, cause the network device to perform the method according to the above second aspect.

In a fifth aspect of the present disclosure, a computer readable storage medium is provided. The computer readable storage medium has instructions stored thereon, which, when executed by a processor of a network device, cause the network device to perform the method according to the above first aspect.

In a sixth aspect of the present disclosure, a computer readable storage medium is provided. The computer readable storage medium has instructions stored thereon, which, when executed by a processor of a network device, cause the network device to perform the method according to the above second aspect.

In a seventh aspect of the present disclosure, a computer program product is provided. The computer program product comprises instructions, which, when executed by a processor of a network device, cause the network device to perform the method according to the above first aspect.

In an eighth aspect of the present disclosure, a computer program product is provided. The computer program product comprises instructions, which, when executed by a processor of a network device, cause the network device to perform the method according to the above second aspect.

With the embodiments of the present disclosure, the guard band between frequency bands can be allocated flexibly according to the scheduling result, such that the spectrum resource can be utilized in an efficient way.

BRIEF DESCRIPTION OF THE DRAWINGS

The above and other objects, features and advantages will be more apparent from the following description of embodiments with reference to the figures, in which:

FIGS. 10 to 13 are flowcharts illustrating methods implemented in a communication system including a host computer, a base station and a user equipment.

DETAILED DESCRIPTION

Figure 1:
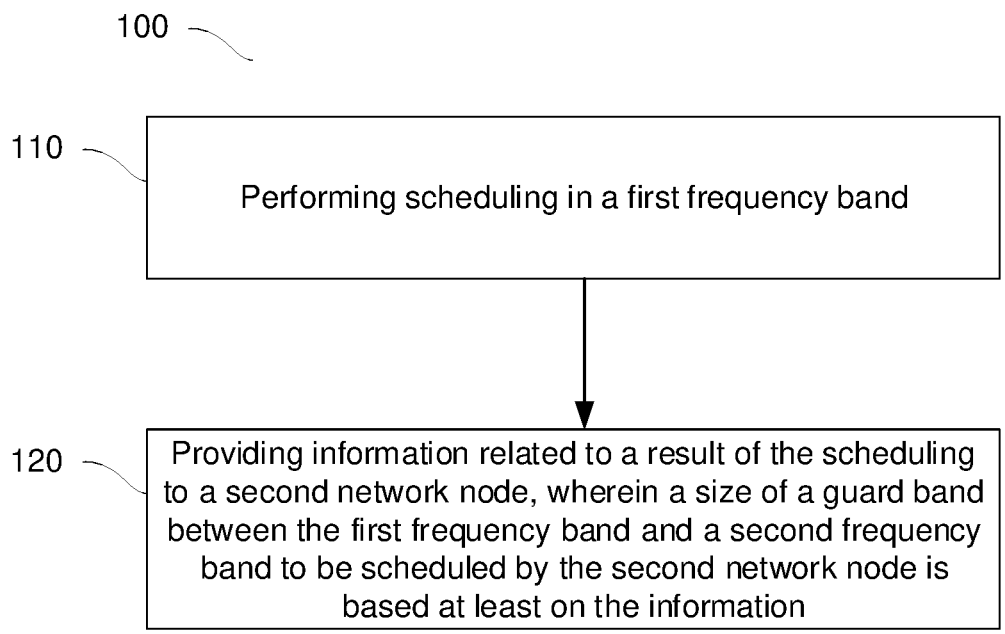
FIG. 1 is a flowchart illustrating a method at a first network node according to embodiments of the present disclosure.

As used herein, the term "wireless communication network" refers to a network following any suitable wireless communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), LTE, and/or other suitable 1G, 2G, 2.5G, 2.75G, 3G, 4G, 4.5G, 5G, 6G communication protocols; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" or "network node" refers to a device in a communication network via which a terminal device accesses the network and receives services therefrom. Examples of the network device may include a base station (BS), an access point (AP), or any other suitable device in the wireless communication network. The BS may be, for example, a node B (NodeB or NB), an evolved NodeB (eNodeB or eNB), a next generation NodeB (gNodeB or gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes, positioning nodes or the like. More generally, however, the network device may represent any suitable device (or group of devices) capable, configured, arranged, and/or operable to enable and/or provide a terminal device access to the wireless communication network or to provide some service to a terminal device that has access to the wireless communication network.

The term "terminal device" refers to any end device that can access a wireless communication network and receive services therefrom. By way of example and not limitation, the terminal device may refer to a mobile terminal, a user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, mobile phones, cellular phones, smart phones, tablets, personal digital assistants (PDAs), wearable devices, vehicle-mounted wireless terminal devices, wireless endpoints, or the like.

In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. As a further example, a UE may represent a device that is intended for sale to, or operation by, a human user but that may not initially be associated with a specific human user.

As yet another example, in an Internet of Things (IoT) scenario, a terminal device may represent a machine or other device that performs monitoring, sensing and/or measurements, and transmits the results of such monitoring, sensing and/or measurements to another terminal device and/or network equipment. The terminal device may in this case be a machine-to-machine (M2M) device, which may in a 3GPP context be referred to as a machine-type communication (MTC) device.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As mentioned above, in dynamic spectrum sharing, a guard band is required between the frequency bands used by different RATs or different BWPs to reduce the interference. In the existing solutions, the guard band usually has a fixed size or bandwidth for all the scenarios to ensure that the PRBs adjacent to the guard band are not impacted by the interference even in the worst case. However, such solutions may cause a waste of spectrum resource because the required size of the guard band in many cases is less than the fixed size.

Thus, there is a need for flexible guard band allocation to reduce the waste of spectrum resource and improve the spectrum utilization efficiency.

In the below description, embodiments may be described by taking the spectrum sharing of different RATs as an example. However, it should be noted that the discussions in the disclosure are applicable to the case where different BWPs share the spectrum or any other cases where a guard band is required to separate two frequency bands.

FIG. 1 is a flow chart illustrating a method 100 at a first network node according to embodiments of the present disclosure. The first network node may be, for example, a scheduler for a first RAT (e.g., LTE), which may be implemented by software, hardware or a combination thereof.

At block 110, the first network node performs scheduling in a first frequency band. For example, the first network node may allocate PRB(s) and/or MCS for each candidate UE of the first RAT. The first frequency band may correspond to the first RAT, and the bandwidth of the first frequency band occupied by the first RAT may be determined based on the demands of the UEs associated with the first network node.

At block 120, the first network node provides information related to a result of the scheduling to a second network node. The first network node may provide the information to the second network node directly or indirectly via one or more other entities. For example, the first network node may send the information to a central control module or device and then the central control module or device may forward the information to the second network node with or without pre-processing.

Similar to the first network node, the second network node may be, for example, a scheduler for a second RAT (e.g., NR), which may also be implemented by software, hardware or a combination thereof. The first and second network nodes may be located in the same network device or in different network devices, which is not limited. Moreover, the communication between the first and second network nodes may be or may not be transmitted through an external hardware interface, which is also not limited.

Figure 2:
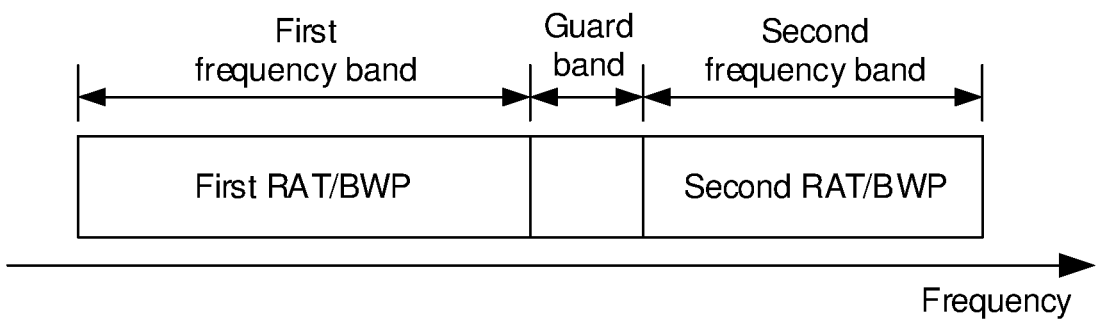
FIG. 2 is a schematic diagram illustrating an example of the first frequency band, the guard band and the second frequency band according to embodiments of the present disclosure.

Based at least on the information related to the scheduling result of the first network node, a size of a guard band between the first frequency band and a second frequency band to be scheduled by the second network node can be determined. The bandwidth of the second frequency band occupied by the second RAT may be determined based on the demands of the UEs associated with the second network node. For illustration, FIG. 2 is a schematic diagram showing an example of the first frequency band, the guard band and the second frequency band. According to an embodiment, the first and second frequency bands may have different subcarrier spacings.

It comes to the inventors' mind that the required size of guard band may depend on the tolerance to the interference between the first and second frequency bands (i.e., the tolerable inter-band interference), while in turn, the tolerable inter-band interference may depend on the scheduling result.

For example, the tolerable inter-band interference may be related to the scheduled MCS. If a UE is allocated with a high MCS by the scheduler (e.g., when the UE is located at cell center), which means a high Signal to Interference plus Noise Ratio (SINR) is expected for the coming uplink or downlink transmission, then the receiver may have a low tolerance to the inter-band interference (i.e., sensitive to the inter-band interference). In this case, a large bandwidth (e.g., a large number of PRBs) needs to be reserved for the guard band to separate the first and second frequency bands. On the other hand, if a UE is allocated with a low MCS by the scheduler (e.g., when the UE is located at cell edge), which means a low SINR is expected for the coming uplink or downlink transmission, then the receiver may have a high tolerance to the inter-band interference (i.e., robust to the inter-band interference). In this case, a small bandwidth (e.g., a small number of PRBs) can be reserved for the guard band or even no guard band is necessary.

As another example, the tolerable inter-band interference may be related to the allocated PRBs. If a transmission is allocated with a large number of PRBs (i.e., a big payload for the coming transmission), it may have a high tolerance to the interference and require a small guard band. On the other hand, if a transmission is allocated with a small number of PRBs (i.e., a small payload for the coming transmission), it may have a low tolerance to the interference and require a large guard band. Here is an example. For a transmission with 100 PRBs, if 4 PRBs are polluted by the interference, the error may be efficiently corrected by the channel coding and thus a small guard band or even no guard band will suffice. However, for a transmission with only 4 PRBs, if the 4 PRBs are polluted by the interference, the error cannot be corrected and thus the final error rate (e.g., Block Error Rate (BLER)) may be significantly deteriorated. In this case, a large guard band may be necessary.

Since the tolerable inter-band interference may depend on the scheduling result, it may be advantageous to determine the guard band size based on the scheduling result as described with respect to FIG. 1, such that the guard band size can be adapted to the tolerable inter-band interference of the first and/or the second RAT. As compared with the fixed guard band size, this scheduling-aware guard band size allocation may reduce the waste of spectrum resource and thus improve the spectrum utilization efficiency as well as the cell throughput.

Further details of the method 100 will be described below.

According to an embodiment, the scheduling by the first network node at block 110 may be performed without considering the interference from the second frequency band, which may allow for an easier scheduling for the first network node. However, it should be noted that it is also possible for the first network node to perform the scheduling by assuming an inter-band interference level.

According to an embodiment, when the first network node performs the scheduling at block 110, it may allocate PRBs adjacent to the second frequency band to one or more terminal devices (e.g., UEs) with a low MCS level and/or a large PRB number. This will make the transmissions adjacent to the second frequency band more robust to the inter-band interference and thus improve the whole performance of the first RAT.

According to an embodiment, the information provided at block 120 may include a metric indicating a tolerable inter-band interference for at least one terminal device operating in the first frequency band. As an example, the metric may be the upper limit of the inter-band interference power that will generate neglectable impact on the receiver performance for the UEs operating in the first frequency band. As mentioned above, this tolerable inter-band interference may depend on the scheduling result in the first frequency band. Accordingly, in an embodiment, the metric may be determined by the first network node based on at least one of the interference plus noise power, the MCS and the PRB number allocated for the at least one terminal device. For example, the metric or the tolerance will be higher for a higher interference plus noise power, a lower MCS level and/or a larger PRB number. In practice, the metric indicating the tolerance may be determined using a lookup table which may be pre-calculated and contain the relationship between the metric and at least one of the MCS level, the PRB allocation and the interference plus noise power.

Alternatively, the information provided at block 120 may include the scheduling result, such as the interference plus noise power, the MCS and/or the PRB number allocated for at least one terminal device operating in the first frequency band. Then the second network node, instead of the first network node, may use this information to determine the metric indicating the tolerable inter-band interference for the at least one terminal device. It should be noted that, the metric can also be determined by another entity (e.g., a central control module or device) and then provided to the second network node, which is not limited.

The information may further include the position of the boundary of the first frequency band so that the second network node are able to allocate PRBs for guard band.

According to an embodiment, the information provided at block 120 may include a result of PRB allocation in the first frequency band, which may help the second network node determine the boundary between the guard band and the first frequency band.

As the inter-band interference will mainly affect the transmissions adjacent to the guard band, it may be preferable to determine the guard band size based on the tolerance for the terminals that are allocated with PRBs adjacent to the guard band, instead of the terminals that are allocated with PRBs remote from the guard band or all the terminals operating in the first frequency band. Accordingly, in an embodiment, the at least one terminal device for which the metric indicating the tolerable inter-band interference is determined may include terminals that are allocated with PRBs adjacent to the guard band.

According to an embodiment, the method 100 can be performed per scheduling period in the first frequency band, which enables a dynamic allocation of guard band with variable size.

According to an embodiment, the first RAT is selected according to a predetermined priority order of RATs. For example, in the case where LTE and NR are sharing the spectrum, LTE may be selected as the first RAT while NR may be selected as the second RAT according to a predetermined order. According to another embodiment, a RAT normally carrying more traffic than the other RATs may be selected as the first RAT. According to yet another embodiment, a RAT having a smaller subcarrier spacing than the other RATs may be selected as the first RAT, because the RAT having a larger subcarrier spacing will have a shorter symbol duration and thus may have a shorter transmission time interval (TTI), making it more flexible to adapt to the scheduling result of the first RAT.

Figure 3:
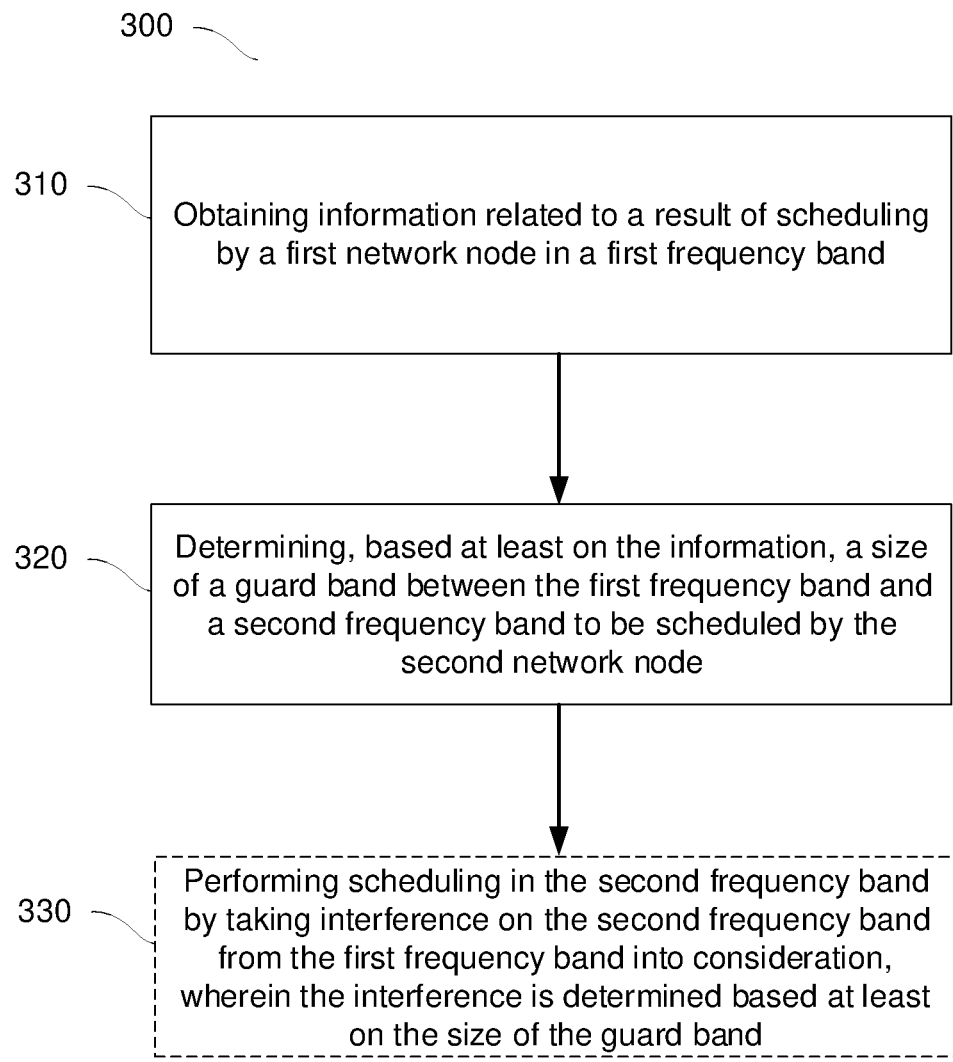
FIG. 3 is a flowchart illustrating a method at a second network node according to embodiments of the present disclosure.

FIG. 3 is a flow chart illustrating a method 300 at the second network node according to embodiments of the present disclosure. The second network node may be the one described above in connection with FIG. 1.

At block 310, information related to a result of scheduling by a first network node in a first frequency band is obtained. The information may be provided by the first network node or another entity (e.g., a central control module or device) as described above in connection with FIG. 1. As mentioned above, the information may be provided to the second network node directly or indirectly from the first network node.

At block 320, the second network node determines, based at least on the information, a size of a guard band between the first frequency band and a second frequency band to be scheduled by the second network node.

As mentioned with regard to FIG. 1, the information may include a metric indicating a tolerable inter-band interference for at least one terminal device operating in the first frequency band. Then the second network node may determine the size of the guard band based on this metric. The guard band size may be determined using a lookup table which can be pre-calculated and contain the relationship between the metric and the guard band size.

Alternatively, in the case where the information includes at least one of an interference plus noise power, an MCS and a PRB number for at least one terminal device operating in the first frequency band, the second network node may determine the metric indicating the tolerable inter-band interference for the at least one terminal device based on the information, and then determine the size of the guard band based at least on the metric. It should be noted that, the guard band size can also be determined directly from the interference plus noise power, the MCS and/or the PRB number for the terminal devices in the first frequency band, which can be realized by a lookup table or similar techniques. More details regarding the information related to the scheduling result can be referred to the description with regard to FIG. 1 and are omitted here.

According to an embodiment, at block 320, the size of the guard band may be determined such that an interference on the at least one terminal device from the second frequency band is below the tolerable inter-band interference. The interference from the second frequency band can be calculated by assuming different candidate sizes of the guard band, and the candidate size that causes the interference from the second frequency band below the tolerable inter-band interference may be selected as the guard band size. More details will be described below with respect to FIGS. 4 and 5.

According to an embodiment, after determining the size of the guard band and allocating the PRBs for the guard band, the second network node may perform scheduling for the second RAT in the second frequency band by taking interference on the second frequency band from the first frequency band into consideration, as indicated in block 330 of FIG. 3. Here, the interference on the second frequency band from the first frequency band may be determined based at least on the size of the guard band.

When performing the scheduling, similarly to the first network node, the second network node may allocate PRBs adjacent to the first frequency band to one or more terminal devices (e.g., UEs) with a low MCS level and/or a large PRB number. This will make the transmissions adjacent to the first frequency band more robust to the inter-band interference and thus improve the whole performance of the second RAT.

According to an embodiment, the method 300 can be performed per scheduling period in the second frequency band, which enables a dynamic allocation of guard band with variable size.

More details of the method 300 are similar to those described with respect to FIG. 1 and thus are omitted here.

Among the two or more RATs that need to share the frequency spectrum, one of them may be selected as the first RAT corresponding to the first network node that provides the scheduling result to the other network node(s). The first RAT may have priority over the other RATs, especially in the case of tight spectrum resources, because the first RAT will perform the scheduling without considering the demands of the other RATs or the interference from the other RATs, and the size of the guard band will be determined to meet the performance requirement of the first RAT. In contrast, the other RATs may need to consider the interference from the first RAT in the presence of the guard band when performing the scheduling or link adaption.

According to an embodiment, the first RAT is selected according to a predetermined priority order of RATs. For example, in the case where LTE and NR are sharing the spectrum, LTE may be selected as the first RAT while NR may be selected as the second RAT according to a predetermined order. According to another embodiment, a RAT normally carrying more traffic than the other RATs may be selected as the first RAT. According to yet another embodiment, a RAT having a smaller subcarrier spacing than the other RATs may be selected as the first RAT, because the RAT having a larger subcarrier spacing will have a shorter symbol duration and thus may have a shorter transmission time interval (TTI), making it more flexible to adapt to the scheduling result of the first RAT.

Figure 4:
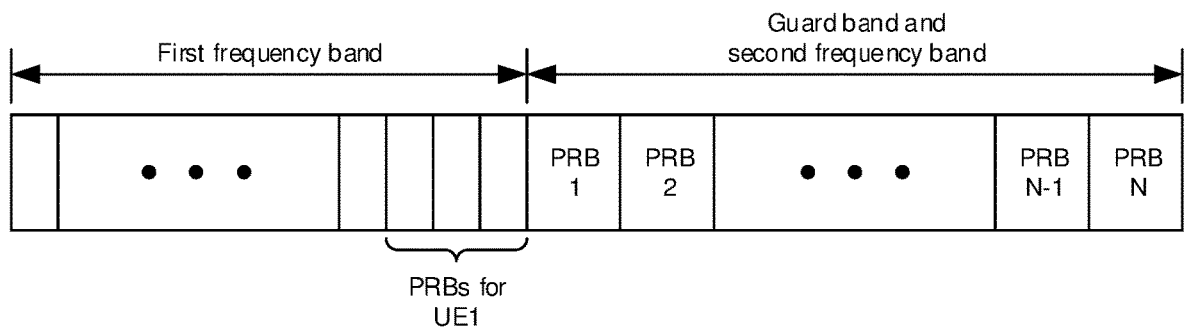
FIG. 4 is a schematic diagram illustrating an example of PRB arrangement of the first frequency band, the guard band and the second frequency band according to embodiments of the present disclosure.
Figure 5:
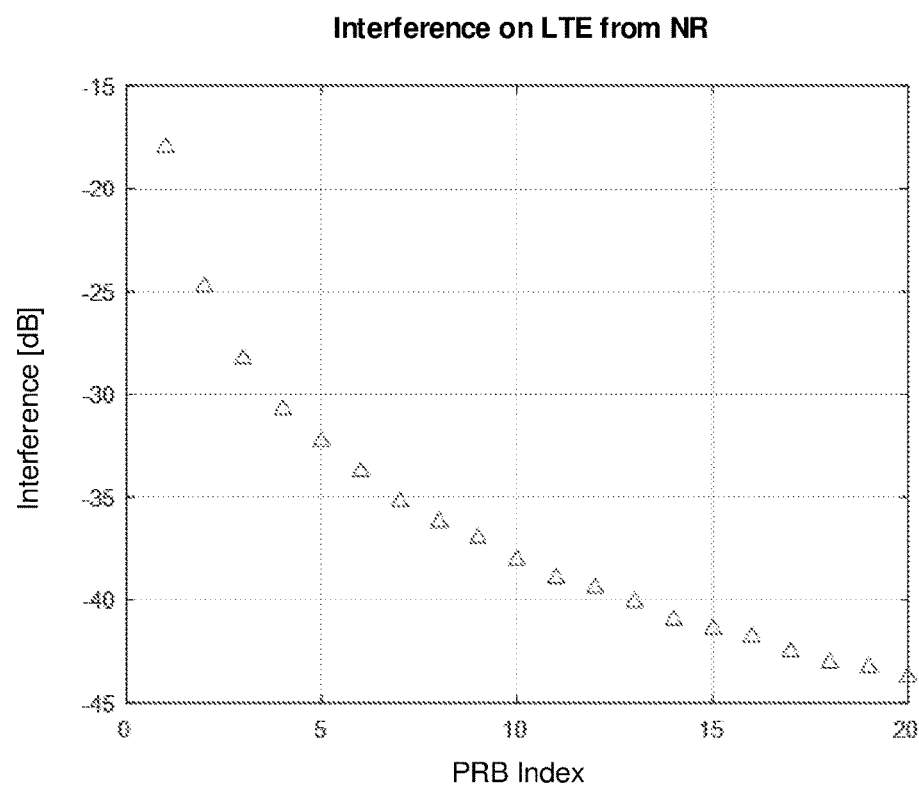
FIG. 5 is a plot showing the simulated interference on the PRB in the first frequency band closest to the guard band from each PRB in the guard band and the second frequency band according to embodiments of the present disclosure.

An example will be described below with respect to FIGS. 4 and 5, showing how to determine the guard band based on the scheduling result of the first RAT. Suppose the first RAT is LTE and the second RAT is NR, and the first and second network nodes are schedulers. In this example, the tolerable interference on the LTE UE that is allocated with PRBs most adjacent to the guard band (hereinafter referred to as UE1) is considered to determine the guard band size. However, it should be noted that the tolerable interference on more LTE UEs can be considered to determine the guard band size, which is not limited.

In this example, the first scheduler performs the scheduling for LTE in the first frequency band without considering the inter-band interference. The interference plus noise power of receiver without inter-band interference for UE1 can be obtained by link adaption, which is denoted as $IN_{wo\_interband}$. It should be noted that $IN_{wo\_interband}$ may correspond to the MCS and may also be got by UE measurement report for downlink or the measurement by the network device (e.g., gNB or eNB) for uplink.

An SINR degrade margin, $Margin_{SINR}$, can be preset (e.g., 0.1 dB or 0.3 dB) for UE1, which means a degradation within the margin may generate a neglectable impact on the receiver performance. Then the tolerable inter-band interference at the receiver side for UE1, $Intf\_RX_{tolerance}$, can be obtained from the following equation:

$$10*\log10\left(\frac{IN_{wo\_interband} + Intf\_Rx_{tolerance}}{IN_{wo\_interband}}\right) = Margin_{SINR}[dB] \quad \text{Eq. (1)}$$

With the pathloss PL between the transmitter side and the receiver side of UE1, the tolerable inter-band interference at the transmitter side for UE1, $Intf\_Tx_{tolerance}$, can be obtained by the following equation:

$$Intf\_Tx_{tolerance}[dBm] = Intf\_Rx_{tolerance}[dBm] + PL[dB] \quad \text{Eq. (2)}$$

The pathloss PL can be obtained in many ways, which is known in the art and thus not described here. The metric $Intf\_RX_{tolerance}$ or $Intf\_Tx_{tolerance}$ may correspond to the metric indicating the tolerable inter-band interference as described above with respect to FIGS. 1 and 2.

Based on the tolerable inter-band interference, $Intf\_Tx_{tolerance}$, at the transmitter side for UE1, the second scheduler can determine the size of the guard band, i.e., how many PRBs should be reserved for the guard band, as described in more detail below.

FIG. 4 shows an example of PRB arrangement of the first frequency band for LTE, the guard band and the second frequency band for NR. As shown in FIG. 4, there are N PRBs in the guard band and the second frequency band, but the size of the guard band still needs to be determined, which will be described below.

The interference of each PRB outside the first frequency band (i.e., PRB 1 to PRB N in FIG. 4) on UE1 can be determined, e.g., by simulation, and stored in advance in the network device. As an example, FIG. 5 is a plot showing the simulated interference on the PRB in the first frequency band closest to the guard band from each PRB in the guard band and the second frequency band, assuming that the first and second frequency bands correspond to LTE and NR, respectively, and LTE and NR have the same power spectrum density. Please note that the vertical axis of FIG. 5 has a unit of dB, and the interference in the unit of dBm may be obtained by adding the interference shown in FIG. 5 to the transmitting power of the corresponding PRB in the guard band and the second frequency band. Similarly, the interference on the other PRBs of LTE can also be predetermined and stored. Thus, the interference on LTE UE1 can be obtained by summing up the interferences on all the PRBs allocated to UE1 (e.g., 3 PRBs in the example of FIG. 4). In this example, the interference on UE1 of LTE from PRB i (i=1 to N) of NR is denoted as Intf (PRB i).

Then the following expression can be used to determine how many PRBs should be reserved for the guard band.

$$\sum_{i=1}^{N} F_i * Intf(PRBi) \leq Intf\_Tx_{tolerance} \quad \text{Eq. (3)}$$

Here, $F_i$ is a flag for PRB i. $F_i=1$ means the corresponding PRB i is usable for NR, while $F_i=0$ means the corresponding PRB i is reserved for guard band. Initially, all the $F_i$ are set to 1. If the sum on the left side of Eq. (3) is larger than the right side, then $F_1$ is set to 0, which means that PRB 1 is reserved for the guard band. Then continue to compare the left side and right side of Eq. (3) to determine whether $F_2$ should be set to 0. If the sum on the left side of Eq. (3) is still larger than the right side, then $F_2$ is set to 0. This process continues until the left side of Eq. (3) is equal to or smaller than the right side. In this way, it can be determined that how many PRBs should be reserved to make sure the interference on UE1 from the second frequency band is not beyond the tolerance of UE1, and thus the size of the guard band can be determined.

It should be noted that, although in this example, the interferences on UE1 from all the PRBs (i.e., PRB 1 to PRB N) in the guard band and the second frequency band are considered in Eq. (3), part of the PRBs, e.g., a predetermined number of PRBs starting from the boundary of the first frequency band, can be used instead, because PRBs remote from the first frequency band may have little interference on it.

Figure 6A:
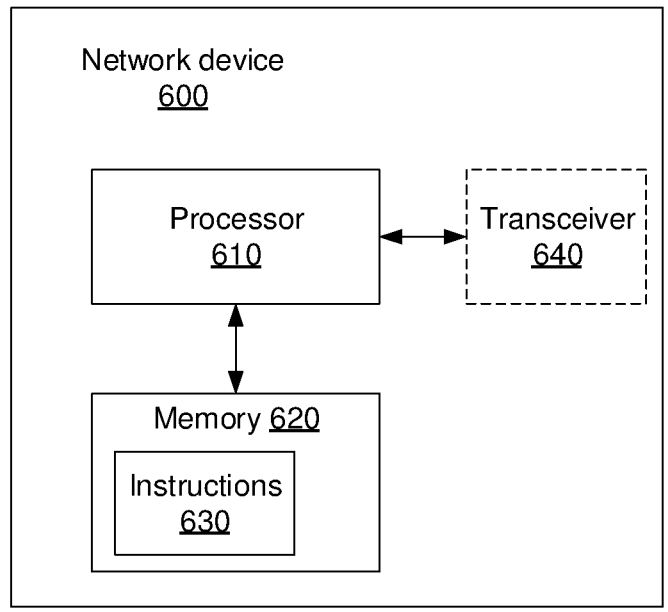
FIGS. 6A-6B are block diagrams illustrating two exemplary network devices, respectively, according to embodiments of the present disclosure.

FIG. 6A is a block diagram of a network device 600 according to embodiments of the present disclosure.

The network device 600 includes a processor 610 and a memory 620. Optionally, the network device 600 may further include a transceiver 640 coupled to the processor 610. The memory 620 contains instructions 630 executable by the processor 610 to cause the network device 600 to perform the actions of the method 100. Particularly, the memory 620 may contain instructions that, when executed by the processor 610, cause the network device 600 to perform scheduling in a first frequency band and provide information related to a result of the scheduling to a second network node. A size of a guard band between the first frequency band and a second frequency band to be scheduled by the second network node may be based at least on the information.

According to an embodiment, the information may comprise at least one of an interference plus noise power, an MCS and a PRB number for at least one terminal device operating in the first frequency band.

According to an embodiment, a metric indicating a tolerable inter-band interference for the at least one terminal device may be based on the information, and the size of the guard band is determined based at least on the metric.

According to an embodiment, the information may comprise a metric indicating a tolerable inter-band interference for at least one terminal device operating in the first frequency band.

According to an embodiment, the metric may be determined based on at least one of an interference plus noise power, an MCS and a PRB number for the at least one terminal device.

According to an embodiment, the tolerable inter-band interference may be larger for a higher interference plus noise power, a lower MCS level and/or a larger PRB number for the at least one terminal device.

According to an embodiment, the at least one terminal device may comprise one or more terminal devices allocated with PRBs adjacent to the guard band.

According to an embodiment, the size of the guard band may be determined such that an interference on the at least one terminal device from the second frequency band is below the tolerable inter-band interference.

According to an embodiment, the information may comprise a result of PRB allocation in the first frequency band by the network device 600.

According to an embodiment, the scheduling in the first frequency band may be performed by the network device 600 without considering interference from the second frequency band.

According to an embodiment, performing the scheduling in the first frequency band may comprise: allocating PRBs adjacent to the second frequency band to one or more terminal devices with a low MCS level and/or a large PRB number.

According to an embodiment, the first and second frequency bands may have different subcarrier spacings.

According to an embodiment, the first frequency band may carry more traffic and/or have a smaller subcarrier spacing than the second frequency band.

According to an embodiment, the first and second frequency bands may correspond to a first RAT and a second RAT, respectively, or correspond to a first bandwidth part and a second bandwidth part, respectively, of the same RAT.

According to an embodiment, the actions by the network device 600 may be performed per scheduling period in the first frequency band.

According to an embodiment, the network device 600 and/or the second network node may be a scheduler.

It should be noted that, more details described with reference to FIGS. 1-5 are also applicable here and may be omitted.

Figure 6B:
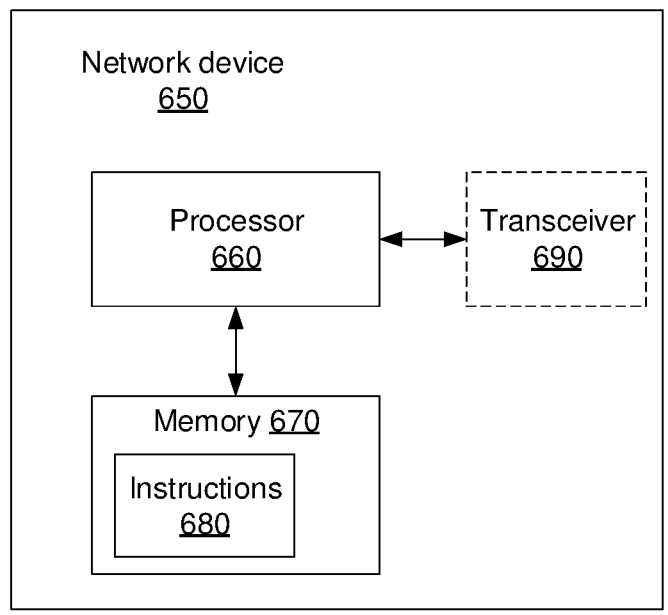

FIG. 6B is a block diagram of a network device 650 according to embodiments of the present disclosure.

The network device 650 includes a processor 660 and a memory 670. Optionally, the network device 650 may further include a transceiver 690 coupled to the processor 660. The memory 670 contains instructions 680 executable by the processor 660 to cause the network device 650 to perform the actions of the method 300. Particularly, the memory 670 may contain instructions 680 that, when executed by the processor 660, cause the network device 650 to obtain information related to a result of scheduling by a first network node in a first frequency band, and determine, based on the information, a size of a guard band between the first frequency band and a second frequency band to be scheduled by the network device 650.

According to an embodiment, the memory 670 may further contain instructions 680 that, when executed by the processor 660, cause the network device 650 to perform scheduling in the second frequency band by taking interference on the second frequency band from the first frequency band into consideration, wherein the interference is determined based at least on the size of the guard band.

According to an embodiment, performing the scheduling in the second frequency band may comprise allocating PRBs adjacent to the guard band to one or more terminal devices with a low MCS level and/or a large PRB number.

Other details about the network device 650 are similar to those described with respect to the network device 600 and thus are omitted here. It should also be noted that, the details described with reference to FIGS. 1-5 are also applicable here and may be omitted.

The memories 620 and 670 may be of any type suitable to the local technical environment and may be implemented using any suitable data storage technology, such as semiconductor-based memory terminal devices, magnetic memory terminal devices and systems, optical memory terminal devices and systems, fixed memory and removable memory, as non-limiting examples.

The processors 610 and 660 may be of any type suitable to the local technical environment, and may include one or more of general purpose processors, special purpose processors (e.g., Application Specific Integrated Circuit (ASICs)), microprocessors, digital signal processors (DSPs) and processors based on multicore processor architecture, as non-limiting examples.

Figure 7A:
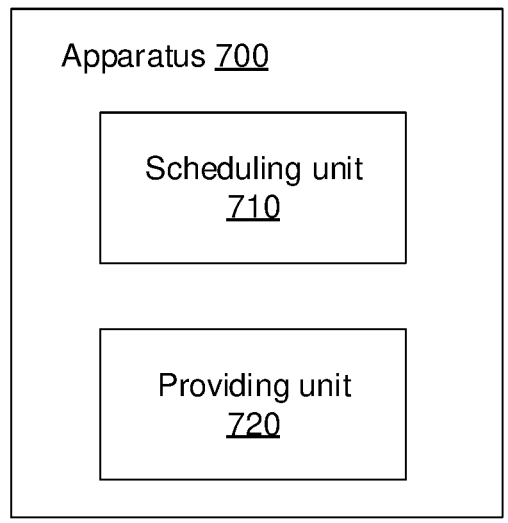
FIGS. 7A-7B are block diagrams illustrating exemplary apparatuses that can respectively perform the methods of FIGS. 1 and 3 according to embodiments of the present disclosure.

FIG. 7A is a block diagram of an apparatus 700 according to embodiments of the present disclosure, which can be configured to perform the method 100 as described in connection with FIG. 1.

The apparatus 700 may include a scheduling unit 710 and a providing unit 720. The scheduling unit 710 may be configured to perform scheduling in a first frequency band. The providing unit 720 may be configured to provide information related to a result of the scheduling to a second network node. A size of a guard band between the first frequency band and a second frequency band to be scheduled by the second network node is determined based at least on the information The apparatus 700 can be implemented as the network device 600 or as a software and/or a physical device within the network device 600 or communicatively coupled to the network device 600.

Further details about the apparatus 700 are similar to those described with respect to FIGS. 1-5 and are omitted here.

Figure 7B:
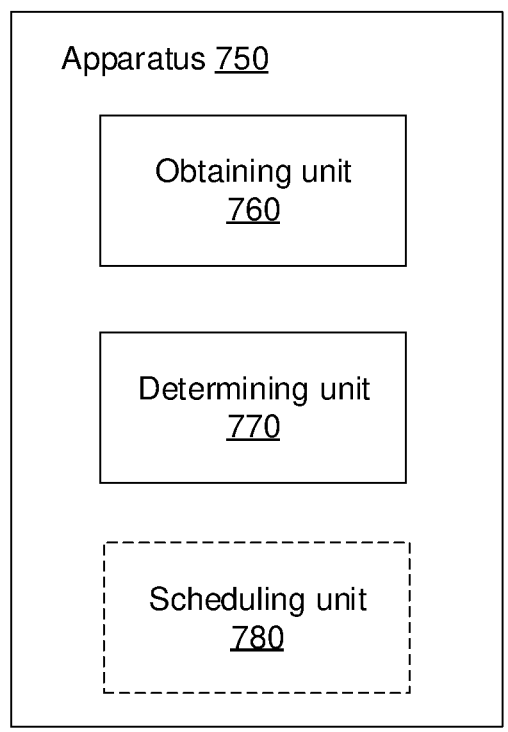

FIG. 7B is a block diagram of an apparatus 750 according to embodiments of the present disclosure, which can be configured to perform the method 300 as described in connection with FIG. 3.

The apparatus 750 may include an obtaining unit 760 and a determining unit 770. The obtaining unit 760 may be configured to obtain information related to a result of scheduling by a first network node in a first frequency band. The determining unit 770 may be configured to determine, based at least on the information, a size of a guard band between the first frequency band and a second frequency band to be scheduled by the apparatus 750.

In an embodiment, the apparatus 750 may further include a scheduling unit 780 configured to perform scheduling in the second frequency band by taking interference on the second frequency band from the first frequency band into consideration. The interference is determined based at least on the size of the guard band The apparatus 750 can be implemented as the network device 650 or as a software and/or a physical device within the network device 650 or communicatively coupled to the network device 650.

Further details about the apparatus 750 are similar to those described with respect to FIGS. 1-5 and are omitted here.

The units as described in FIGS. 7A and 7B may be implemented as software and/or hardware, or a device comprising the software and/or the hardware, which is not limited. For example, they can be implemented as computer readable programs that can be executed by a processor. Alternatively, they can be implemented as processing circuitry such as ASICs and/or field programmable gate arrays (FPGAs).

The present disclosure may also provide computer readable media having instructions thereon. The instructions, when executed by a processor of a network device or a terminal device, cause the network device or terminal device to perform the method according to the embodiments as described above. The computer readable media may include computer-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The computer readable media may also include computer readable transmission media (also called a carrier), for example, electrical, optical, radio, acoustical or other form of propagated signals-such as carrier waves, infrared signals, and the like.

The present disclosure may also provide computer program products including instructions. The instructions, when executed by a processor of a terminal device or a network device, cause the terminal device or the network device to perform the method according to the embodiments as described above.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, units, apparatus, systems, techniques or methods described herein may be implemented in, as non-limiting examples, hardware, software, firmware, special purpose circuits or logic, general purpose hardware or controller or other computing devices, or some combination thereof.

Figure 8:
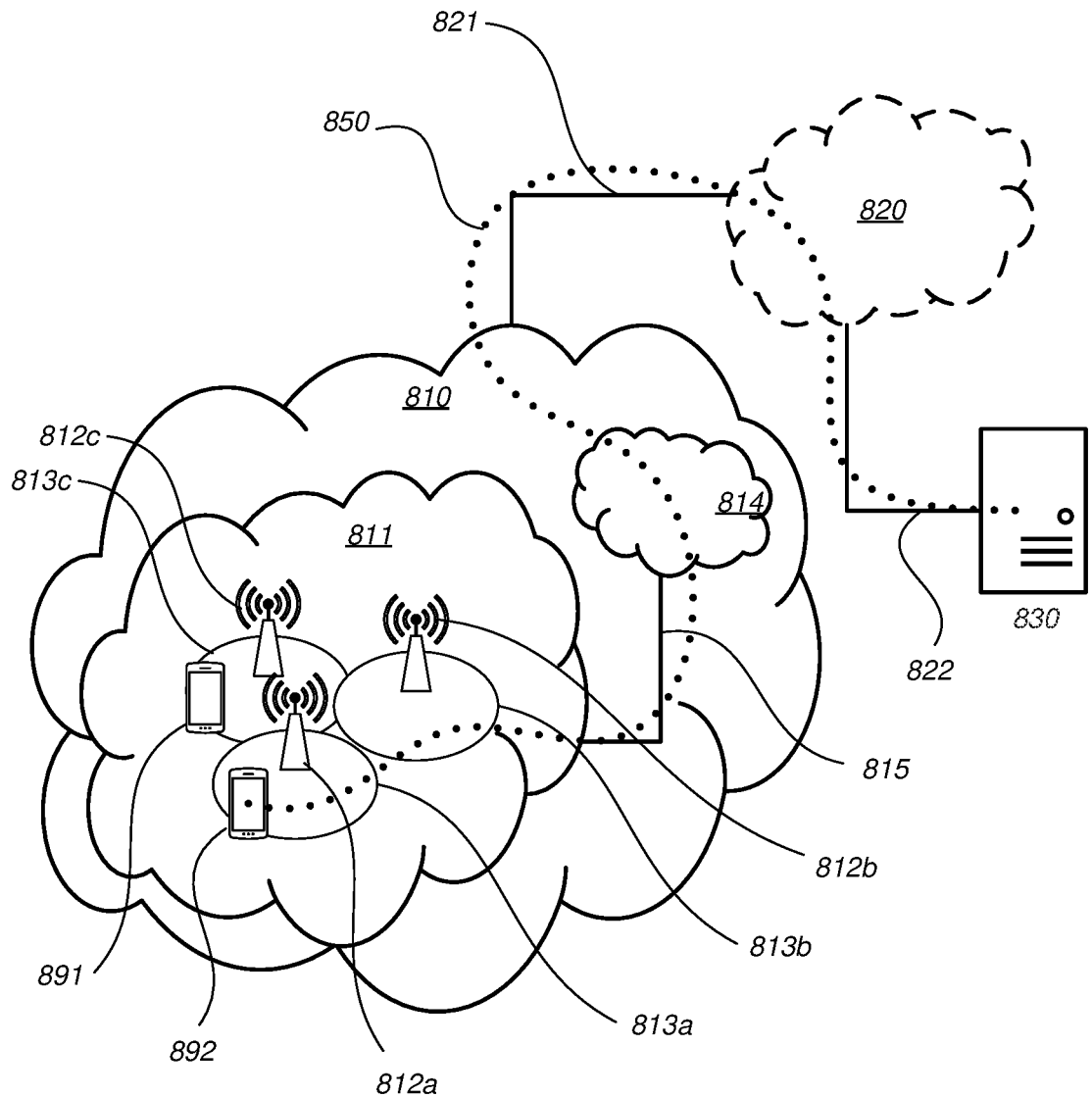
FIG. 8 schematically illustrates a telecommunication network connected via an intermediate network to a host computer.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first user equipment (UE) 891 located in coverage area 813c is cond to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. The connections 821, 822 between the telecommunication network 810 and the host computer 830 may extend directly from the core network 814 to the host computer 830 or may go via an optional intermediate network 820. The intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between one of the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, a base station 812 may not or need not be informed about the past routing of an incoming downlink communication with data originating from a host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with a UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
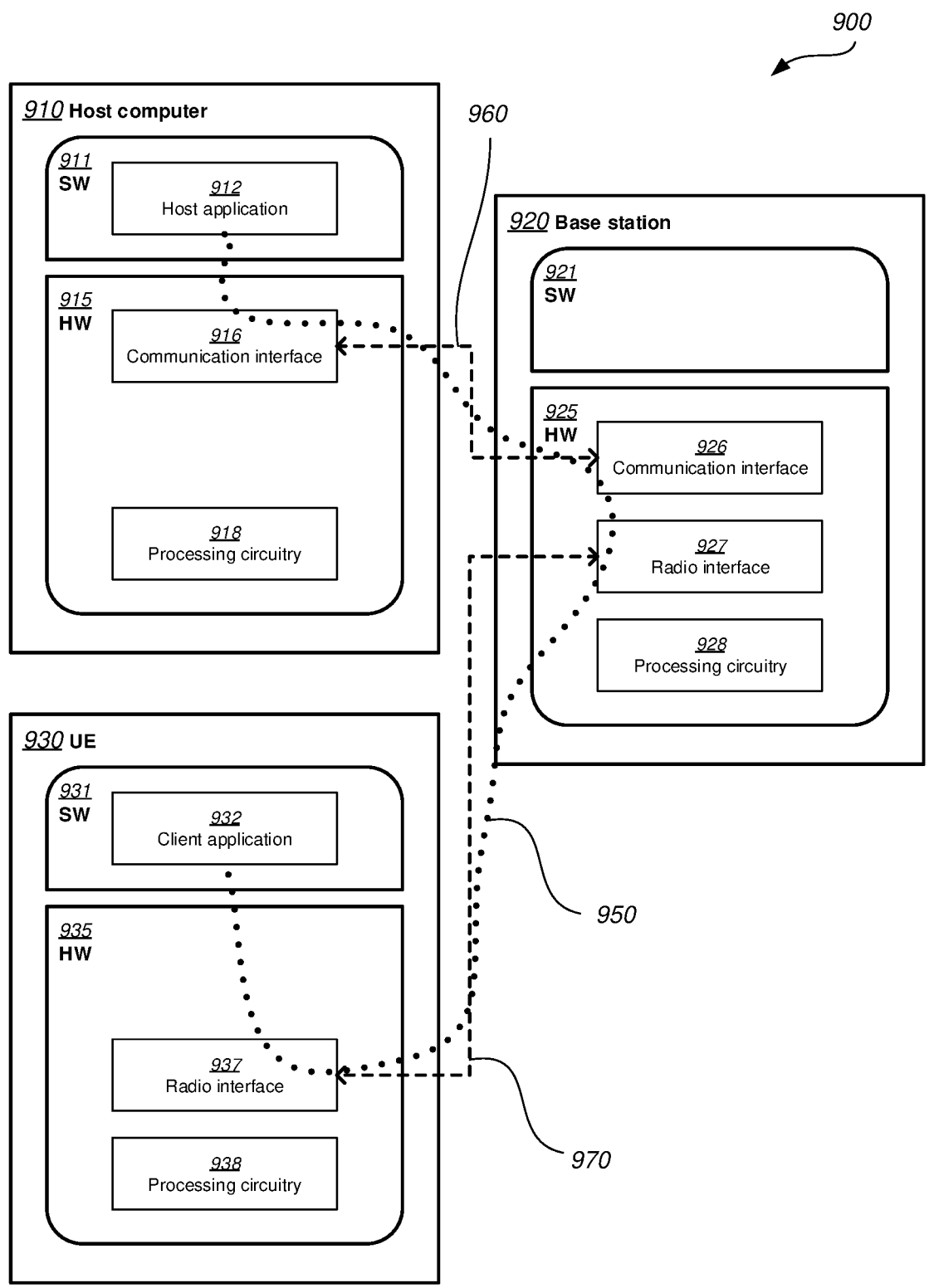
FIG. 9 is a generalized block diagram of a host computer communicating via a base station with a user equipment over a partially wireless connection.

It is noted that the host computer 910, base station 920 and UE 930 illustrated in FIG. 9 may be identical to the host computer 830, one of the base stations 812a, 812b, 812c and one of the UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the use equipment 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the spectrum utilization efficiency and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 950 between the host computer 910 and UE 930, in response to variations in the measurement results. The measurement procedure and/or the network functionality for reconfiguring the OTT connection 950 may be implemented in the software 911 of the host computer 910 or in the software 931 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer's 910 measurements of throughput, propagation times, latency and the like. The measurements may be implemented in that the software 911, 931 causes messages to be transmitted, in particular empty or 'dummy' messages, using the OTT connection 950 while it monitors propagation times, errors etc.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 1010 of the method, the host computer provides user data. In an optional substep 1011 of the first step 1010, the host computer provides the user data by executing a host application. In a second step 1020, the host computer initiates a transmission carrying the user data to the UE. In an optional third step 1030, the base station transmits to the UE the user data which was carried in the transmission that the host computer initiated, in accordance with the teachings of the embodiments described throughout this disclosure. In an optional fourth step 1040, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 1110 of the method, the host computer provides user data. In an optional substep (not shown) the host computer provides the user data by executing a host application. In a second step 1120, the host computer initiates a transmission carrying the user data to the UE. The transmission may pass via the base station, in accordance with the teachings of the embodiments described throughout this disclosure. In an optional third step 1130, the UE receives the user data carried in the transmission.

Figures 12, 13:
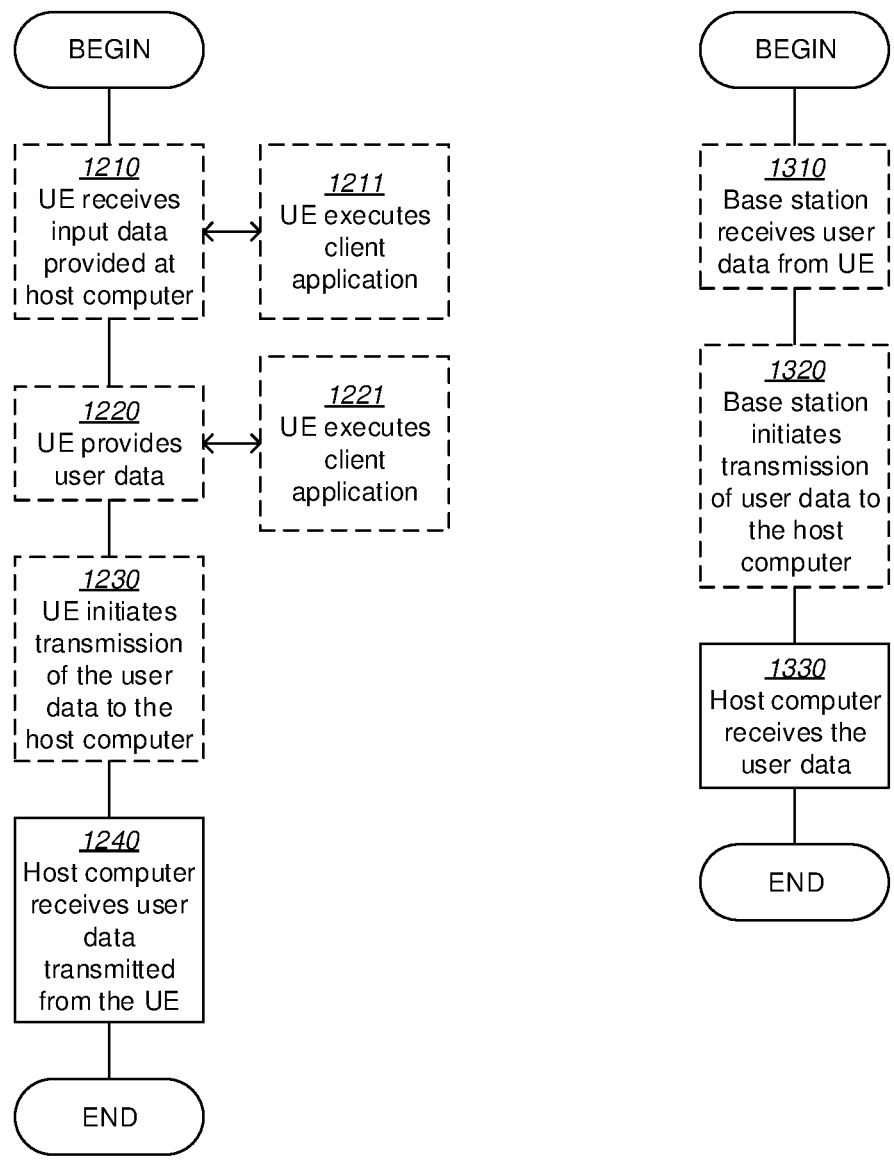

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 1210 of the method, the UE receives input data provided by the host computer. Additionally or alternatively, in an optional second step 1220, the UE provides user data. In an optional substep 1221 of the second step 1220, the UE provides the user data by executing a client application. In a further optional substep 1211 of the first step 1210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1230, transmission of the user data to the host computer. In a fourth step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 1310 of the method, in accordance with the teachings of the embodiments described throughout this disclosure, the base station receives user data from the UE. In an optional second step 1320, the base station initiates transmission of the received user data to the host computer. In a third step 1330, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method at a first network node, comprising:
    performing scheduling in a first frequency band; and
    providing information related to a result of the scheduling to a second network node, wherein a size of a guard band between the first frequency band and a second frequency band to be scheduled by the second network node is based at least on the information;
wherein the information comprises at least one of an interference plus noise power, a modulation and coding scheme (MCS) and a physical resource block (PRB) number for at least one terminal device operating in the first frequency band, and wherein a metric indicating a tolerable inter-band interference for the at least one terminal device is based on the information and the size of the guard band is determined based at least on the metric.

2. The method of claim 1, wherein the information comprises a metric indicating a tolerable inter-band interference for at least one terminal device operating in the first frequency band.

3. The method of claim 2, wherein the metric is determined based on at least one of an interference plus noise power, a modulation and coding scheme (MCS) and a physical resource block (PRB) number for the at least one terminal device.

4. The method of claim 1, wherein the tolerable inter-band interference is larger for a higher interference plus noise power, a lower MCS level and/or a larger PRB number for the at least one terminal device.

5. The method of claim 1, wherein the at least one terminal device comprises one or more terminal devices allocated with PRBs adjacent to the guard band.

6. The method of claim 1, wherein the size of the guard band is determined such that an interference on the at least one terminal device from the second frequency band is below the tolerable inter-band interference.

7. The method of claim 1, wherein the information comprises a result of PRB allocation in the first frequency band by the first network node;
    and/or
    wherein the scheduling in the first frequency band is performed by the first network node without considering interference from the second frequency band;
    and/or
    wherein performing the scheduling in the first frequency band comprises:
    allocating PRBs adjacent to the second frequency band to one or more terminal devices with a low MCS level and/or a large PRB number.

8. A method at a second network node, comprising:
    obtaining information related to a result of scheduling by a first network node in a first frequency band; and
    determining, based at least on the information, a size of a guard band between the first frequency band and a second frequency band to be scheduled by the second network node;
wherein the information comprises at least one of an interference plus noise power, a modulation and coding scheme (MCS), a physical resource block (PRB) number for at least one terminal device operating in the first frequency band, and a metric indicating a tolerable inter-band interference for the at least one terminal device, and wherein said determining comprises determining the size of the guard band based at least on the information.

9. The method of claim 8, wherein the information comprises at least one of an interference plus noise power, a modulation and coding scheme (MCS), and a physical resource block (PRB) number for at least one terminal device operating in the first frequency band, and wherein said determining the size of the guard band comprises determining a metric indicating a tolerable-inter-band interference for the at least one terminal device and determining the size of the guard band based at least on the metric.

10. The method of claim 8, wherein the information comprises the metric indicating a tolerable inter-band interference for at least one terminal device operating in the first frequency band and wherein said determining comprises determining the size of the guard band based at least on the metric.

11. The method of claim 8, wherein the tolerable inter-band interference is larger for a higher interference plus noise power, a lower MCS level and/or a larger PRB number for the at least one terminal device.

12. The method of claim 8, wherein the at least one terminal device comprises one or more terminal devices allocated with PRBs adjacent to the guard band.

13. The method of claim 8, wherein the size of the guard band is determined such that an interference on the at least one terminal device from the second frequency band is below the tolerable inter-band interference.

14. The method of claim 8, wherein the information comprises a result of PRB allocation in the first frequency band by the first network node.

15. The method of claim 8, wherein the scheduling in the first frequency band is performed without considering interference from the second frequency band.

16. A network device, comprising:
- a processor;
- a memory configured to store instructions, wherein the instructions, when executed by the processor, cause the network device to:
  - perform scheduling in a first frequency band; and
  - provide information related to a result of the scheduling to a second network node, wherein a size of a guard band between the first frequency band and a second frequency band to be scheduled by the second network node is based at least on the information;

wherein the information comprises at least one of an interference plus noise power, a modulation and coding scheme (MCS) and a physical resource block (PRB) number for at least one terminal device operating in the first frequency band, and wherein a metric indicating a tolerable inter-band interference for the at least one terminal device is based on the information and the size of the guard band is determined based at least on the metric.

* * * * *